Oct. 25, 1966    J. C. OLSEN ET AL    3,280,691
AUTO-COLLIMATION PLUMBING TARGET HAVING
PARTIALLY SILVERED FLOATING MIRROR
Filed Oct. 29, 1962    3 Sheets-Sheet 2

INVENTORS.
JOSEPH C. OLSEN
ORAN K. PERCY
BY
George C. Sullivan
Agent

Oct. 25, 1966 J. C. OLSEN ETAL 3,280,691
AUTO-COLLIMATION PLUMBING TARGET HAVING
PARTIALLY SILVERED FLOATING MIRROR
Filed Oct. 29, 1962 3 Sheets-Sheet 3

INVENTORS.
JOSEPH C. OLSEN
ORAN K. PERCY
BY
*George C. Sullivan*
Agent

3,280,691
AUTO-COLLIMATION PLUMBING TARGET HAVING PARTIALLY SILVERED FLOATING MIRROR

Joseph C. Olsen, Sunnyvale, and Oran K. Percy, Milpitas, Calif., assignors to Lockheed Aircraft Corporation, Los Angeles, Calif.
Filed Oct. 29, 1962, Ser. No. 233,744
2 Claims. (Cl. 88—1)

The present invention relates in general to optical devices and in particular to an optical plumbing device for establishing a truly vertical line over any given point.

Formerly, the devices for establishing a vertical line above a given point included the well known plumb bob, surveying instruments with positioned supports or cups, and various reflective fluid surfaces. All of the devices and methods heretofore employed were very time consuming and therefore costly to operate, and the devices which incorporated a pool of reflecting fluid, for example, mercury, were impractical due to contamination of the mercury which diminished the reflection therefrom.

It is the object of the present invention to provide a simple, practical and particularly effective plumbing device suitable for use in optical tooling procedures and operable to establish a truly vertical line to or through a given point.

Another object of the present invention is the use of a float mounted, partially silvered reflecting surface to establish a truly vertical line using the technique of auto-collimation.

Another object of the present invention is to provide a target positioned below a partially silvered mirror to serve as a reference for fixing a vertical line directly over any given point.

Another object of the present invention is to provide an optical plumbing device which may be sighted through, thereby enabling the device to serve as an alignment instrument.

Another object of the present invention is to provide means of establishing a telescope precisely vertical using techniques of auto-collimation.

Figure 1:
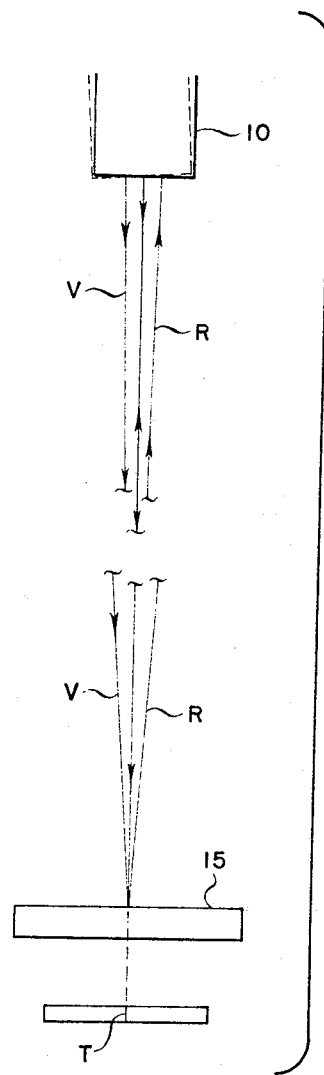
Figure 4:
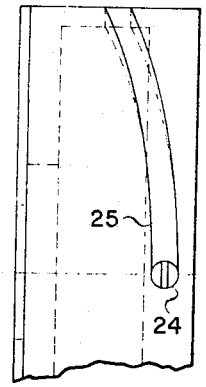
Figure 3:
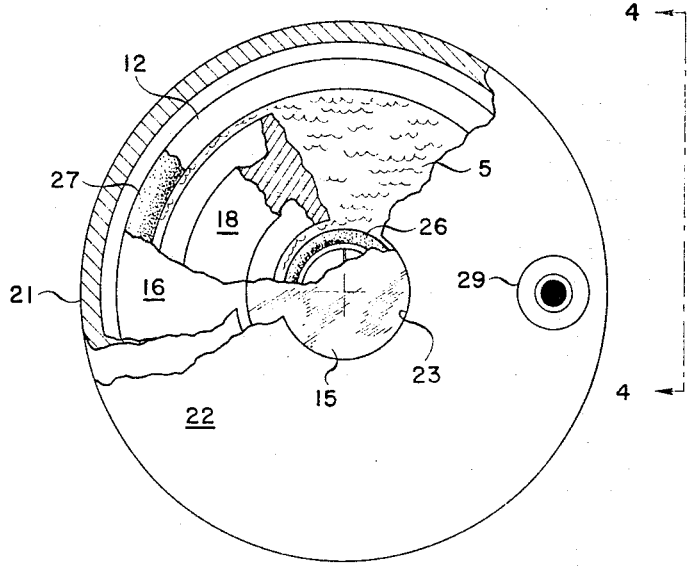
Figure 2:
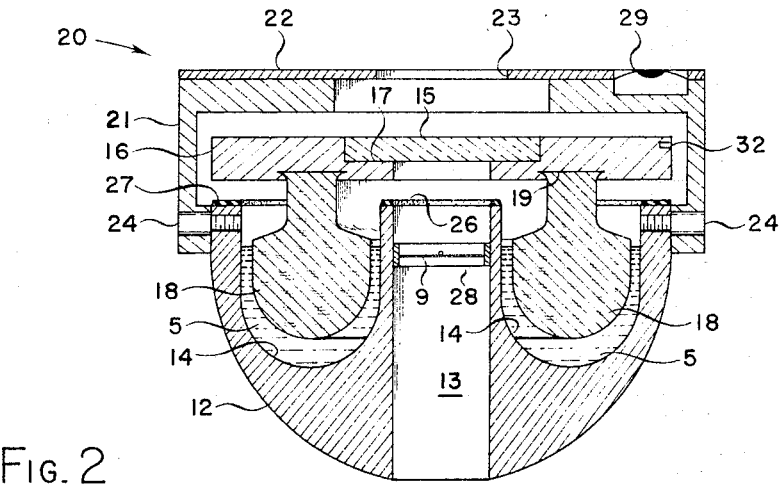
Figure 5:
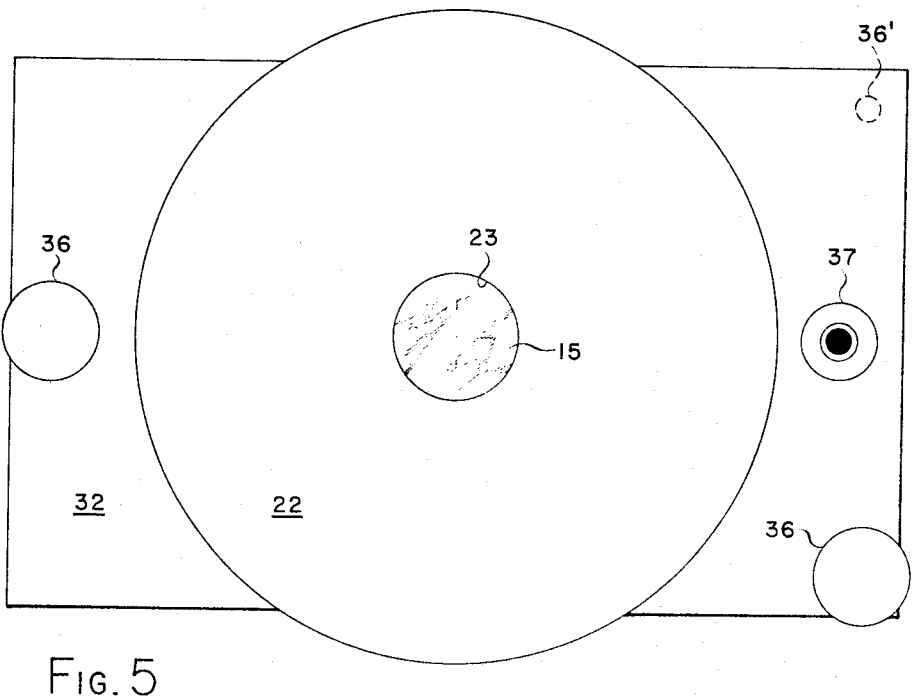
Figure 6:
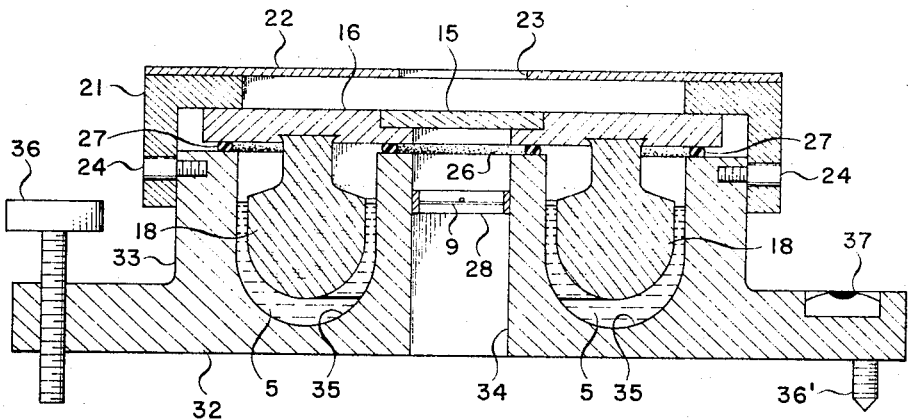

These and other features and objects of the present invention will become apparent upon a perusal of the following specifications and drawings, of which:

FIGURE 1 is a perspective view depicting operation of an optical plumbing device according to the present invention, FIGURE 2 is a cross-sectional drawing of one embodiment of the present optical plumbing device, FIGURE 3 is a top view, partially broken away, of the optical device of FIGURE 2, FIGURE 4 is a partial side view of the cover of the optical device of FIGURE 2 as viewed from one side thereof showing the cover lifting mechanism, FIGURE 5 is the top view of an alternative embodiment of the present optical plumbing device, and FIGURE 6 is a cross-sectional view of FIGURE 5.

In operation, the present invention is governed by the principle of fluid mechanics so that the upper planar surface of an object floating in liquid can be balanced on a horizontal plane. If this upper surface were made a reflecting material as of, for example, a mirror, then this principle could be used with an auto-collimating or auto-reflecting telescope to establish the telescope at a vertical relation above the mirror. A ray of light emanating from the telescope would be reflected from the horizontal surface of the mirror into the telescope. A person sighting through the telescope to the mirror would see the reflected cross hair superimposed on the actual cross hair if the telescope were aligned in an exact perpendicular relation with respect to the mirror. If a 40% mirror were used as the reflecting surface and a target positioned below the mirror, a person focusing the telescope on the target would see through the mirror. The telescope, which is in an exact vertical position, could then be positioned exactly over the target.

Figure 1A:
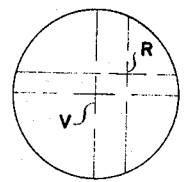

Relating the above principle to the present invention, an auto-collimating telescope 10 is positioned over a target T, from which point a vertical line is to be established. Target T could be in the base of a mine shaft, or in the bottom of an elevator shaft, or in any other location from which it may be desirable to erect a vertical line. Telescope 10 is focused on a horizontally positioned mirror 15, for example, a 40% reflecting mirror of the type commercially available. In all probability, telescope 10 will not be perpendicular and the ray of light V from the telescope 10 to mirror 15 will reflect ray R to the telescope at an angle. A person sighting through telescope 10 would see two sets of cross hairs, the cross hairs of telescope 10 and its reflection, as shown in FIGURE 1a. By adjusting the telescope 10, the viewer corrects the perpendicular alignment until ray of light V and reflected ray R converge, thereby indicating a truly vertical line as mirror 15 is on a horizontal plane.

Figure 1B:
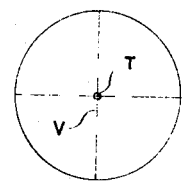

The viewer, having erected a truly vertical line, then focuses telescope 10 on a target T positioned below mirror 15. As the mirror reflects only 40% of ray R from the telescope, most of the light passes through the mirror, and by correct focusing, target T is clearly visible. Telescope 10 may then be positioned directly over target T as shown in FIGURE 1b.

One embodiment of the present invention is shown in FIGURES 2, 3 and 4. A solid, substantially hemispherical base member 12 is provided with an aperture 13 bored perpendicularly through the center of the planar surface thereof. A circular channel 14 is provided, as by machining, in the flat surface of base 12 between the outer diameter thereof and the periphery of aperture 13. A pool of viscous fluid 5 as of, for example, ethylene glycol, is contained within channel 14. A doughnut-shaped circular float 18 of, for example, plastic, is disposed in channel 14 to float upon the fluid 5. An apertured circular plate 16 is mounted on float 18 to serve as a base for disc shaped 40% reflecting mirror 15 seated in a shoulder 17 provided in the aperture of plate 16. A plurality of balancing screws 32 may be inserted in the outer periphery of mirror base 16 to aid in balancing mirror 15 so that it floats in a truly horizontal manner.

An inverted apertured cup member 21, as of aluminum, fits closely over the top portion of base 12 to serve as a cover for the mirror and float members. A convenient aperture 23 may be fashioned in a metal disc 22 which is in turn mounted on the base of cup cover 21 to provide viewing of the mirror 15. Cup 21 is movably secured to base 12 by a plurality of bayonet studs 24 which are inserted through a pair of curved slots cut in the rim of cup 21. In this manner, the bayonet studs 24 serve to ride in the sloped or curved channels 25 so that when cup 21 is revolved 90° the cover may be lowered down on mirror base 16 to lock the mirror and base in position when not in use. Cup 21 as shown in FIGURE 2 is in the open position, with base 16 and mirror 15 floating freely.

A pair of O-rings 26 and 27 are positioned on the inner and outer rim of channel 14 to serve as a seal to prevent the glycol from accidentally spilling when cover 21 is in its down or locked position. A glass ring or disc 9 is horizontally mounted in aperture 13 of base 12 by a retainer 28. Glass disc 9 serves as a target for the device and ideally is positioned at the center of base 12. A bubble level 29 is mounted in the top of cup 21 to serve as means for positioning the instrument in a substantially horizontal position before raising cover 21. By positioning base 12 such that the bubble is in the substantial center of the bubble level, it is hereby insured that mirror base 16 will float freely in the glycol pool.

A second embodiment of the present invention, utilizing the same float, base, mirror, cover, and target as described above is shown in FIGURES 5 and 6. A flat rectangular base 32 provided with a raised center portion 33 serves as the base for the present embodiment. An aperture 34 is provided, as by drilling, in the center of raised portion 33 through the horizontal base 32 and a channel 35 is provided between the aperture and the outer rim of raised portion 33 to serve as means for holding fluid 5. A pair of foot screws 36, one positioned in one corner of base 32 and the other in the center along the side of base 32, provide for rough leveling of the device. A stationary leg 36' is provided in the opposite corner to serve as the third leg for base 32. The advantage in placing a permanent or stationary leg 36' in one corner as depicted in FIGURE 5, rather than at the opposite end of base 32 from the two foot screws, is that only two screwing operations are needed to level the base.

It is noted that cover 21 of FIGURE 6 is shown in the down or locked position. In this manner, base 16 is forced down against O-rings 26 and 27, thereby insuring that the glycol will not be accidentally spilled.

It is to be understood in connection with this invention that the embodiments shown are only exemplary, and that various modifications can be made in construction and arrangement within the scope of the invention as defined in the appended claims.

What is claimed is:

1. An optical device for erecting a vertical line through a given point, comprising: a base member having a substantially horizontal upper planar surface with a vertically extending aperture positioned substantially at the center thereof, a target member provided within said aperture, an annular channel disposed in the upper surface of said base member positioned around said aperture and containing a fluid, an annular float member disposed within said channel to float upon said fluid and a partially silvered reflecting surface horizontally positioned above said aperture and supported by said float member, whereby said target is visible through said partially silvered reflecting surface when viewed from above.

2. The optical device of claim 1 wherein said base is a substantially hemispherically-shaped member and said target member is positioned in said aperture at a point substantially equidistant from the curved surface of said base.

References Cited by the Examiner

UNITED STATES PATENTS

| 701,612 | 6/1902 | Prier | 33—206.2 X |
|---|---|---|---|
| 1,187,733 | 6/1916 | Herlevi | 248—114 |
| 2,118,045 | 5/1938 | Holton | 88—1 |
| 2,557,340 | 6/1951 | Carbonara | 88—1 |
| 2,701,521 | 2/1955 | Taylor | 88—14 X |
| 2,876,673 | 3/1959 | Hamilton | 88—1 |
| 2,995,992 | 8/1961 | Merritt. | |
| 3,153,689 | 10/1964 | Vargady | 88—1 X |

FOREIGN PATENTS 14,976    1903    Great Britain.

OTHER REFERENCES

Longwell, "An Optical Alignment Fixture"; IBM Technical Disclosure Bulletin, vol. 3, No. 7, December 1960.

DAVID H. RUBIN, *Primary Examiner.*

JEWELL H. PEDERSEN, *Examiner.*

J. G. BOLTEN, *Assistant Examiner.*